United States Patent
Edwards et al.

(10) Patent No.: US 6,172,965 B1
(45) Date of Patent: Jan. 9, 2001

(54) DUPLEX TRANSMISSION SCHEME

(75) Inventors: Keith Russell Edwards, Paignton; Alister Graham Burr, York; Timothy Conrad Tozer, Elvington; David Andrew James Pearce, York, all of (GB)

(73) Assignee: Nortel Networks Limited, Montreal (CA)

( * ) Notice: Under 35 U.S.C. 154(b), the term of this patent shall be extended for 0 days.

(21) Appl. No.: 08/955,078

(22) Filed: Oct. 21, 1997

(30) Foreign Application Priority Data

Dec. 23, 1996 (GB) .................................................. 9626774
Jan. 14, 1997 (GB) .................................................. 9700601

(51) Int. Cl.[7] .................................................. H04L 12/26
(52) U.S. Cl. .......................... 370/250; 370/465; 370/470; 370/468; 370/296; 370/294; 370/293; 370/260; 370/276; 370/278; 370/279; 395/2.32; 395/2.28; 375/241; 375/244
(58) Field of Search .................................. 370/465, 468, 370/470, 296, 294, 293, 260, 276, 278, 279, 250; 395/2.32, 2.28; 375/241, 244

(56) References Cited

U.S. PATENT DOCUMENTS

| | | | |
|---|---|---|---|
| 4,949,335 | * 8/1990 | Moore | 370/29 |
| 5,001,703 | * 3/1991 | Johnson et al. | 370/79 |
| 5,124,985 | * 6/1992 | Hoshikawa | 370/95.3 |
| 5,347,562 | * 9/1994 | Candy | 379/58 |
| 5,379,279 | * 1/1995 | Backof et al. | 370/24 |
| 5,384,807 | * 1/1995 | Yatim et al. | 375/27 |
| 5,657,420 | * 8/1997 | Jacobs et al. | 395/2.32 |
| 5,790,532 | * 8/1998 | Sharma et al. | 370/286 |
| 5,864,544 | * 1/1999 | Serinken et al. | 370/282 |
| 5,950,164 | * 9/1999 | Takahashi | 704/270 |

* cited by examiner

Primary Examiner—Alpus H. Hsu
Assistant Examiner—Duc Ho
(74) Attorney, Agent, or Firm—Lee, Mann, Smith, McWilliams, Sweeney & Ohlson (57) ABSTRACT

This invention relates to duplex and to half duplex transmission schemes and more particularly to the application of such schemes in TDMA and other multiple access environments. In accordance with a first aspect of the invention, there is provided a method of multiplexing signals transmitted by a number of terminals onto a communications link; the link having a capacity less than the total capacity of the terminals; the method including the step of varying the rate of encoding of said signals transmitted by said terminals whereby the bandwidth o the transmitted signals corresponds to the portions allocated to the terminals. In accordance with another aspect of the invention, there is provided a system for the communication of signals in real time over a channel; said system adapted to vary the bandwidth of at least one signal such that the number of signals multiplexed onto said channel can be dynamically varied.

6 Claims, 9 Drawing Sheets

Figure 1
Half Duplex Channel

DUPLEX TRANSMISSION SCHEME

TECHNICAL FIELD

This invention relates to duplex and to half duplex transmission schemes and more particularly to the application of such schemes in TDMA and other multiple access environments.

BACKGROUND TO THE INVENTION

Duplex and Half Duplex transmission schemes are used in a variety of voice and data services. Duplex voice schemes are generally perceived by subscribers as providing better service quality than half duplex, whereas half duplex voice schemes provide a more efficient use of system resources than duplex schemes.

Figure 1:
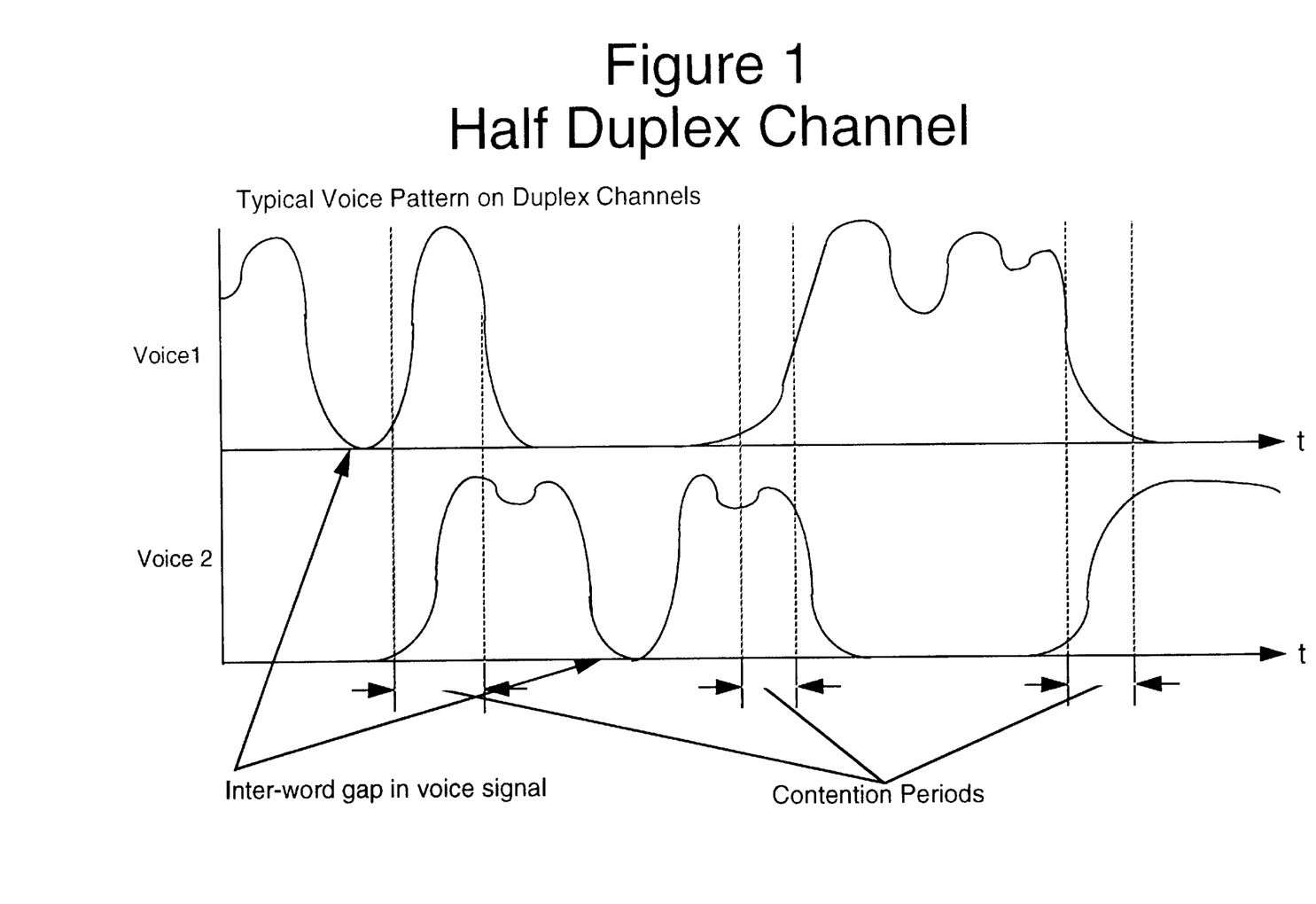
FIG. 1 is a diagrammatic representation of typical voice traffic on a Half Duplex channel.

FIG. 1 is a diagram representative of typical voice traffic operating over a half duplex channel. In such a scheme the listening party is prevented from transmitting a voice signal until the talking party has ceased transmitting.

Figure 2:
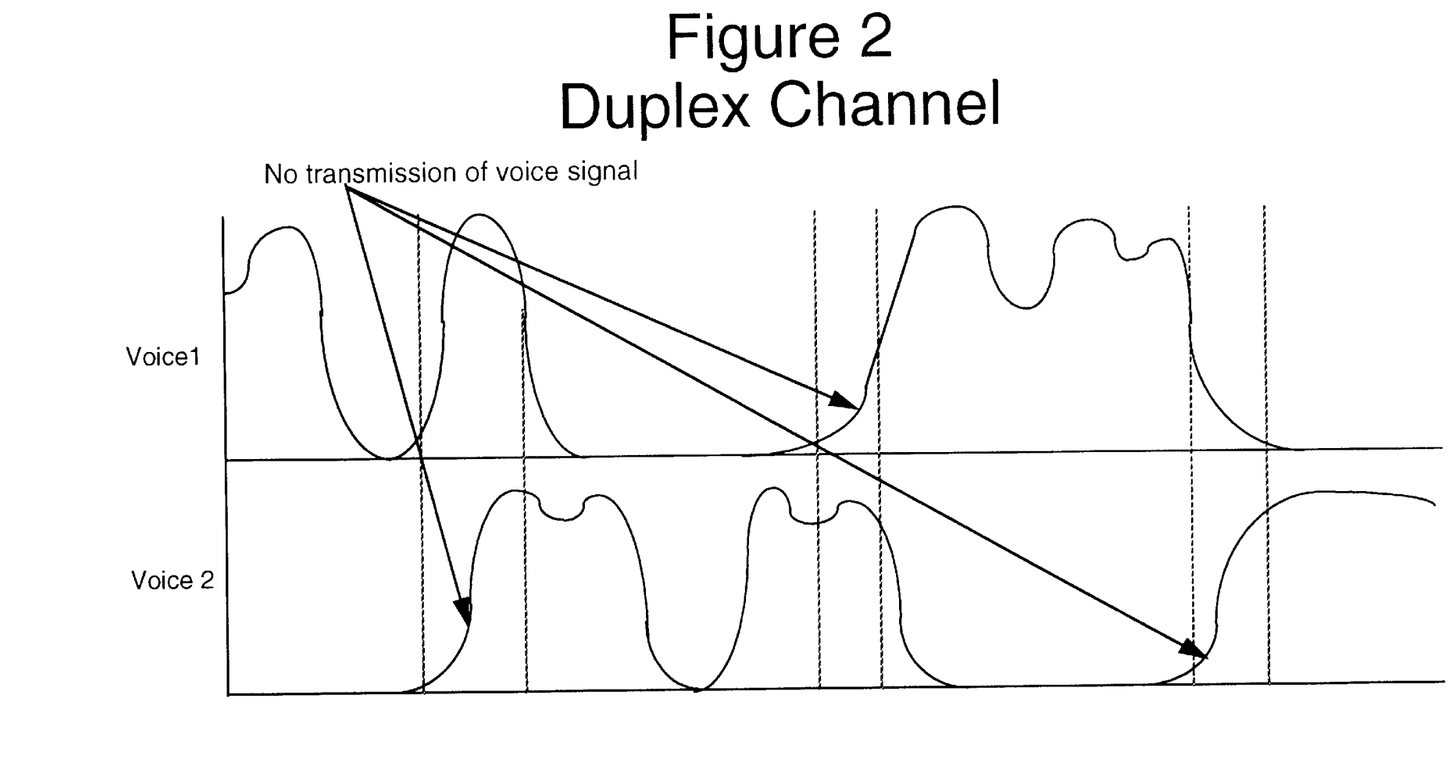
FIG. 2 is a diagrammatic representation of typical voice traffic on a Duplex channel.

FIG. 2 is a diagram representative of typical voice traffic on a duplex channel. The parties to the call have intermittent periods where both parties are talking. These periods may be considered as contention periods. Typically the parties to the call resolve these contention periods between themselves so that a mutually understandable conversation results. It is unusual for both parties to talk at the same time for an extended period.

Duplex transmission schemes have the advantage over half duplex schemes of improved call quality for subscribers. However they have the disadvantage of inefficient use of system resources, as typically one channel will be idle at any one point during a conversation.

One example of a duplex channel is a time division duplex (TDD) arrangement where both parties have alternating access to the channel. Typically, the channel may have a capacity of 72 Kbits$^{-1}$, in an ISDN system. Each party is typically sampled at 32 Kbits$^{-1}$ for 2 ms periods. These sampled signals are transmitted along the channel at the higher data rate of 72 Kbits$^{-1}$ using 1 ms packets of data.

However with typical voice traffic, approximately half of the time slots on the TDD channel will be idle.

WO 95/04412 to Motorola provides a method and apparatus for multiplexing fixed length message data and variably coded speech. A variable rate vocoder receives and codes the speech of an unknown amount at one of full and less than full rates to produce the coded data. U.S. Pat. No. 5,124,701 to France Telecom provides a quantisation device with a variable digital coding rate.

OBJECT OF THE INVENTION

Accordingly it is an object of the present invention to reduce the disadvantages present in the prior art.

SUMMARY OF THE INVENTION

In accordance with a first aspect of the invention, there is provided a method of multiplexing signals transmitted by a number of terminals onto a communications link; the link having a capacity less than the total capacity of the terminals; the method comprising the steps of:

i) monitoring the link for the occurrence of simultaneous transmission of signals over the link by two or more terminals; the bandwidth of the terminals exceeding the capacity of the link;

ii) assigning a portion of the link capacity to the transmitting terminals; the sum of said portions being equal to or less than the capacity of the link;

iii) varying the rate of encoding of said signals transmitted by said terminals whereby the bandwidth of the transmitted signals corresponds to the portions allocated to the terminals.

The link can be a time division duplex link, optionally with the signals being encoded using a variable bit rate encoding scheme or using an adaptive differential pulse code modulation encoding scheme. The link can be a time division duplex link and said signals can be encoded using a variable bit rate encoding scheme and wherein a 32 Kbits$^{-1}$ capacity is allocated to a terminal when only one terminal is transmitting and wherein a 32 Kbits$^{-1}$ capacity is allocated to both terminals when both are transmitting.

In accordance with another aspect of the invention, there is provided a system for the communication of signals in real time over a channel; said system adapted to vary the bandwidth of at least one signal such that the number of signals multiplexed onto said channel can be dynamically varied.

In accordance with another aspect of the invention, there is provided a communications system adapted to multiplex a plurality of signals into frames of information; said frames comprising a plurality of sub-frames; the system adapted to vary the bandwidth of transmitted signals by varying the number of sub-frames allocated to each signal.

BRIEF DESCRIPTION OF THE DRAWINGS

The invention will now be described with reference to the accompanying drawings, wherein:

FIGS. 6 a,b & c are detailed representations of a TDD frame format.

DESCRIPTION OF THE PREFERRED EMBODIMENT

There will now be described by way of example the best mode contemplated by the inventors for carrying out the invention. In the following description, numerous specific details are set out in order to provide a complete understanding of the present invention. It will be apparent, however, to those skilled in the art that the present invention may be put into practice with variations of the specific.

Figure 3:
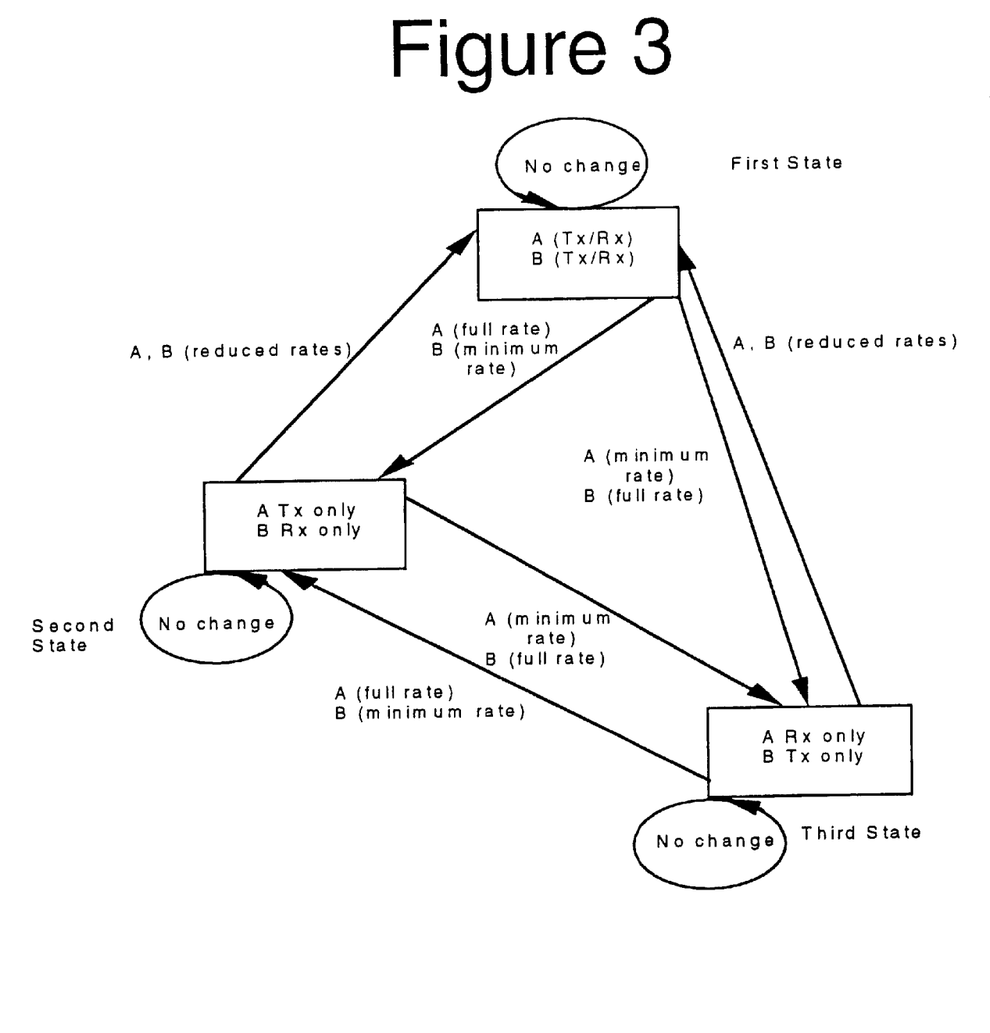
FIG. 3 is a state diagram representation of the present invention.

FIG. 3 shows a state diagram representing an embodiment of the present invention. For real time signals the invention provides what may be described as a pseudo duplex transmission scheme for a channel with a capacity that is less than duplex capacity. In particular, FIG. 3 models an embodiment of a bi-directional channel as a three state system. In the first state both parties are simultaneously transmitting and receiving. In the second and third states, one party is transmitting and one party is receiving. An embodiment of greater complexity can include at least a fourth state where neither party is transmitting or receiving.

Referring now to the first state, where both parties are transmitting and receiving, each party assumes a transmission rate that is less than the maximum rate of the channel. The sum of these rates preferably corresponds to system transmission capacity, although lower bandwidth rates may be adopted.

In the second and third states, one party assumes a maximum transmission rate whilst the second party assumes a minimum transmission rate. Again, the sum of these rates preferably corresponds to system transmission capacity, although lower bandwidth rates may be adopted.

The present invention is most applicable in systems where generally one party is receiving when the other party is transmitting and where it is rare for both parties to transmit and receive simultaneously.

The invention utilises the concept that most information signals have a degree of information density that can be varied by varying, amongst others, the rate of error correction, the rate of signal encoding, filtering bandwidth, filter shape, modulation technique. It is assumed that an intermittent reduction in the resolution of transmitted information can be tolerated by most users where it is traded off against an increase in system performance, such as capacity or throughput rate.

In a digitally based voice system, resolution of a speech signal can be varied by using a speech coding algorithm such as ITV-T G.726 which is an Adaptive Differential Pulse Code Modulation (ADPCM) scheme employing a number of data rates, namely 16,24,32 and 48 Kbits$^{-1}$.

In a broad band system, various signal compression techniques such as Asymmetric Digital Subscriber Line (ADSL) and Very High Speed Digital Subscriber Line (VSDL) technology may be employed. Other forms of signal compression, particularly analogue signal compression may also be applicable.

In the case of voice networks, the present invention adopts a speech channel with a bandwidth that is less than a duplex bandwidth. Subscriber equipment operating on a digital channel may encode speech using a number of different encoding techniques such as variable bit rate schemes. Some of these techniques include Adaptive Differential Pulse Code Modulation (ADPCM), Adaptive Predictive Coding (APC), Linear predictive Coding (LPC), or a hybrid encoding techniques such as the Multipulse-Excitation Linear Predictive Coding (MPE-CPC). ADPCM is an example of a variable bit rate encoding scheme. Other forms of speech coding are detailed in chapter 7 of "Cellular Radio: principles and design" R. C. V. Macario, The Macmillan Press Ltd, 1993.

In one embodiment, each terminal has voice activity detection circuitry which detect whether or not the person using the terminal is speaking. Such voice activity detection circuitry an algorithms are used in cellular mobile access systems, such as the GSM system.

The terminal can also monitor the voice activity of signals received from the channel. When only one party to the conversation is talking, that party is encoded by its terminal at full. In such a system, the terminal receiving a full rate speech signal assumes responsibility for detecting contention between the parties for the channel. This may be achieved by monitoring the speech activity circuit. Contention is detected when voice activity occurs concurrently with the reception of a full rate signal. The detecting terminal signals this contention to the terminal transmitting at full rate according to a predetermined protocol.

When contention is detected, the received signal can be monitored for nulls in-between spoken words. When the party contending for the channel detects such a null it signals to the equipment of the corresponding party that reduced rate encoding is to be employed. The equipment of the corresponding party receiving an encoding rate instruction will proceed with reduced rate encoding accordingly.

Figure 4:
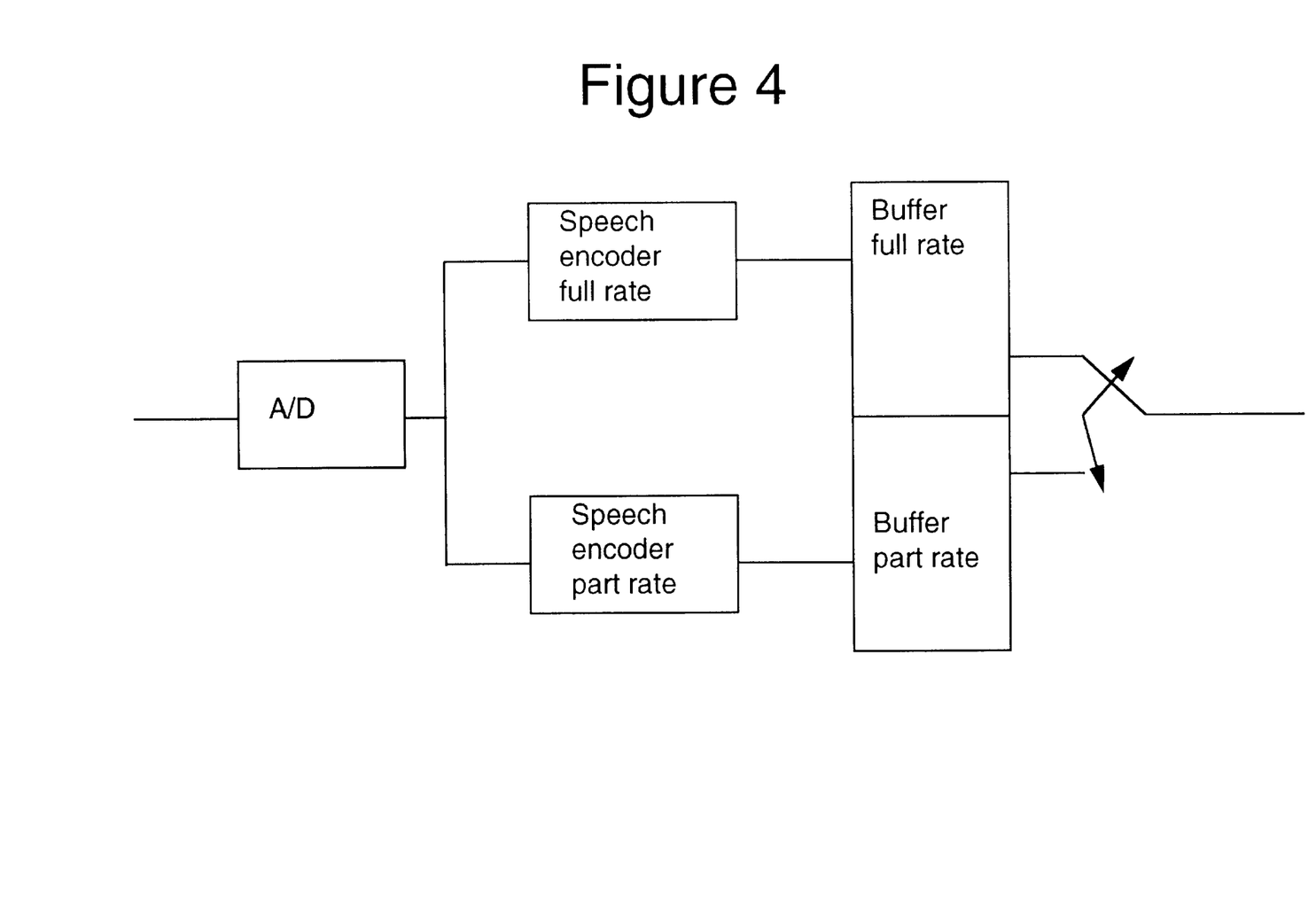
FIG. 4 is a diagram of an embodiment using dual encoders.

In an alternative embodiment, the terminals are synchronised at call set up so that reduced rate signals can be multiplexed onto the channel with minimum delay. In FIG. 4, the subscriber's terminal encodes speech signals at full rate and partial rate in parallel. The output from the encoders being fed into two output buffers, one storing full rate information and the other storing reduced rate information. When contention is signalled, the speaking party switches the output of its transmitter to the reduced rate buffer. The other party contending for the channel also selects the reduced rate signal for transmission.

Whilst speech quality will be reduced during periods where the parties contend for the channel, it is believed that this will be acceptable to a majority of subscribers. It is believed that people typically repeat what they have said following contention on a duplex channel.

An alternative embodiment uses a Time Division Duplex channel. TDD channels may be employed within higher order protocols such as TDMA. Where TDD is employed, it is preferable that one or more bits in each frame be reserved for contention signalling. By introducing this overhead, a faster response by the system to a contention period can be achieved over a system that signals in-between words.

Figure 5A:
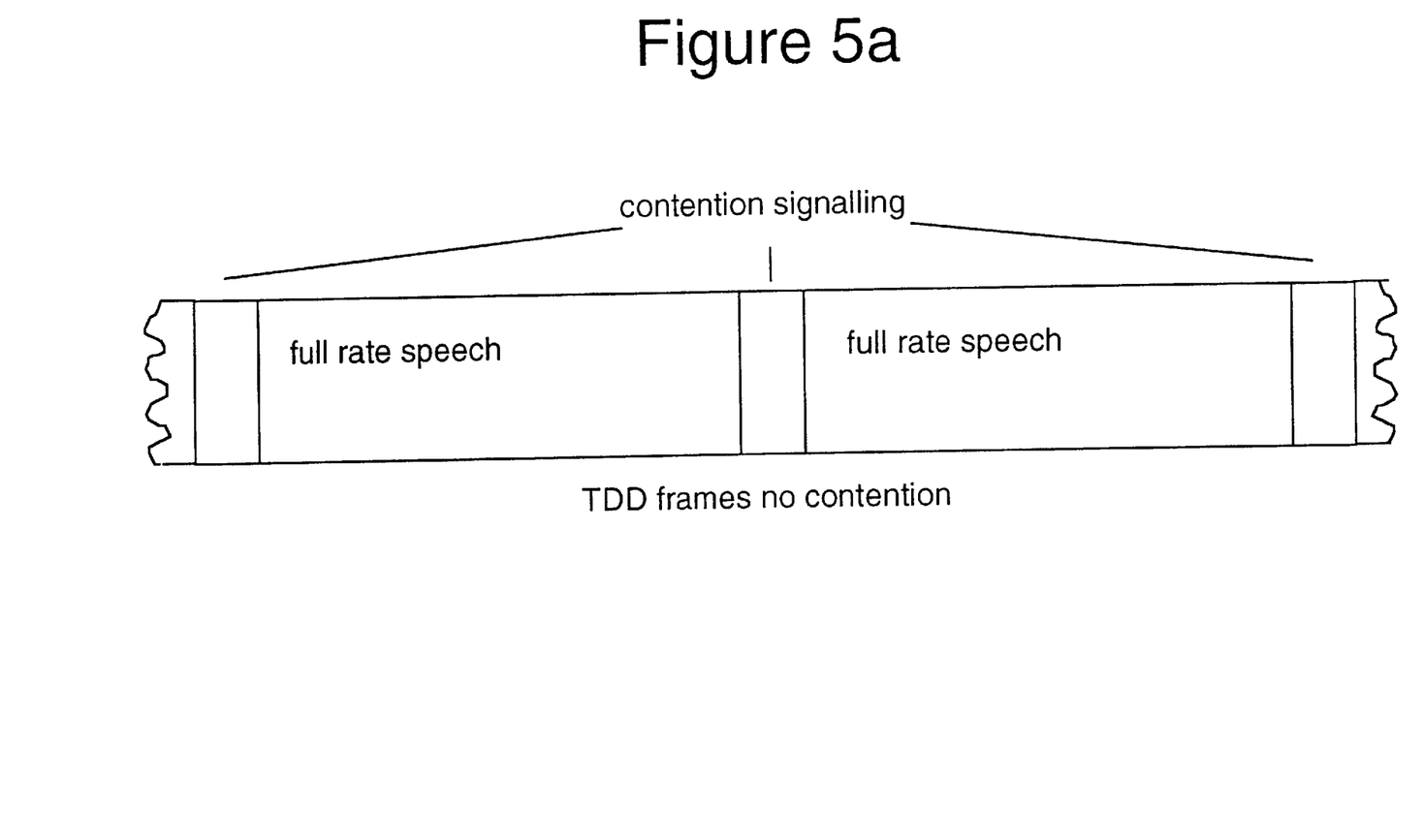
FIG. 5a is a TDD channel without contention.
Figure 5B:
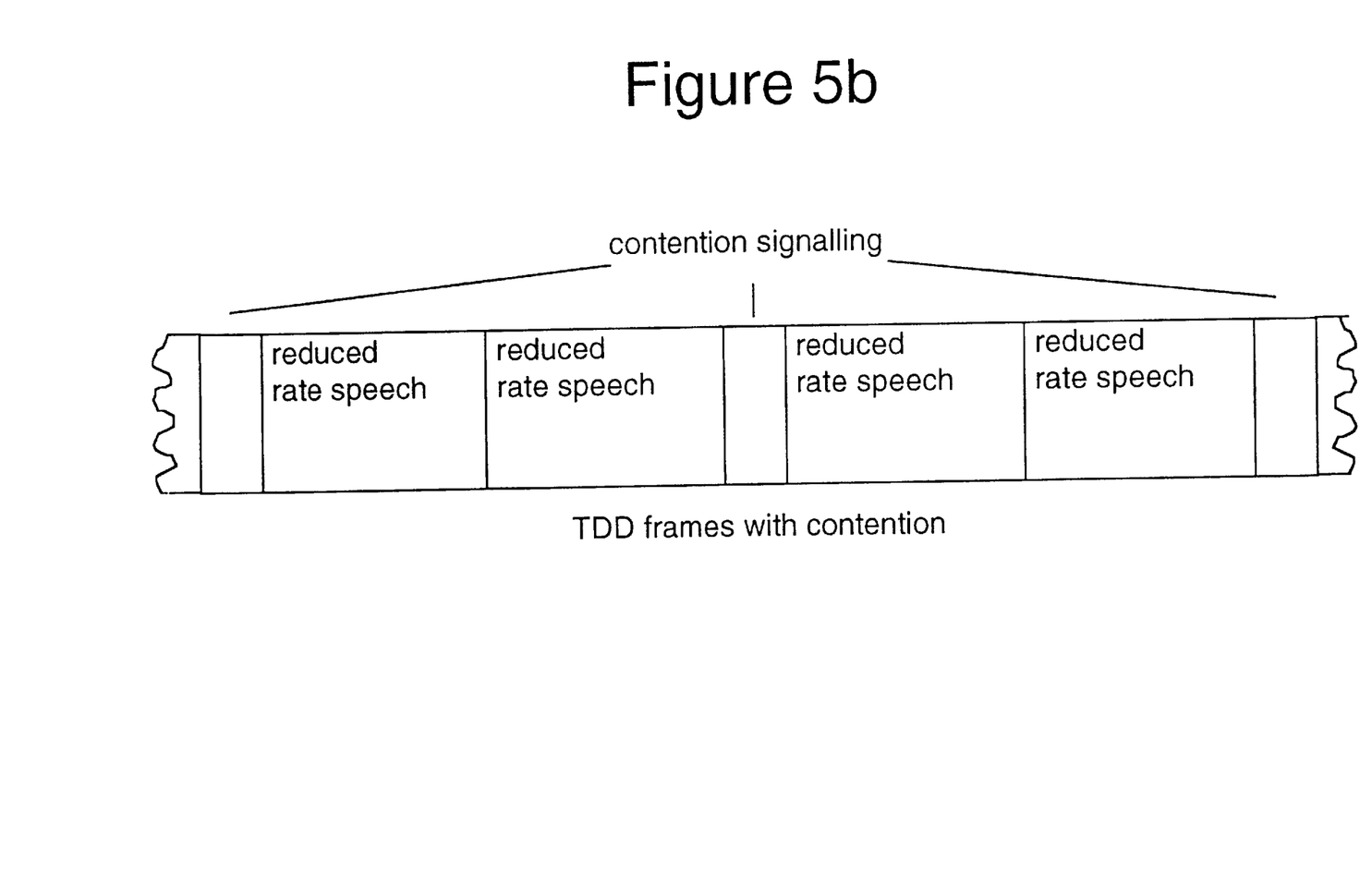
FIG. 5b is a TDD channel with contention.

FIGS. 5a and 5b demonstrate the general principle involved. In 5a, there is no contention for the channel and the transmitting party is encoded at the full channel rate. In 5b, there is contention and each party is encoded at partial channel rate. In this instance, each party nominally shares half of each TDD frame. The voice signals of each party being encoded at reduced rate.

Figure 6A:
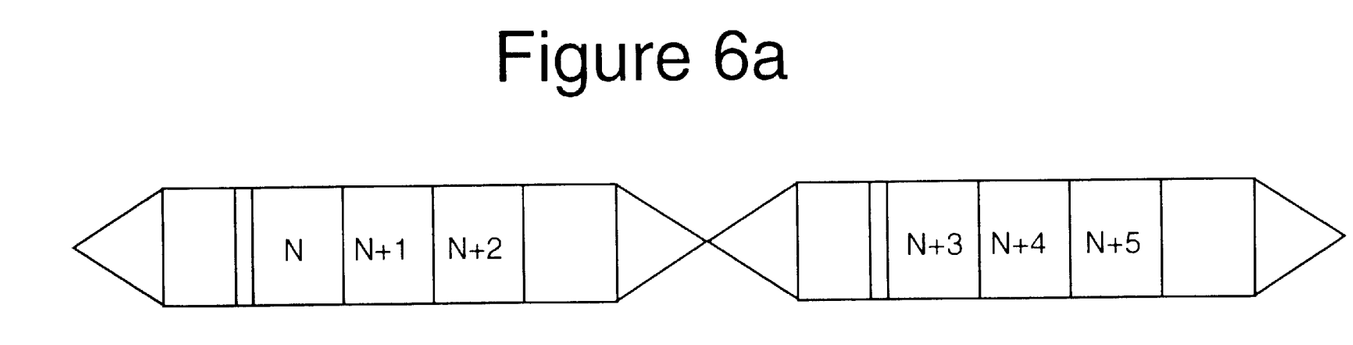
Figure 6B:
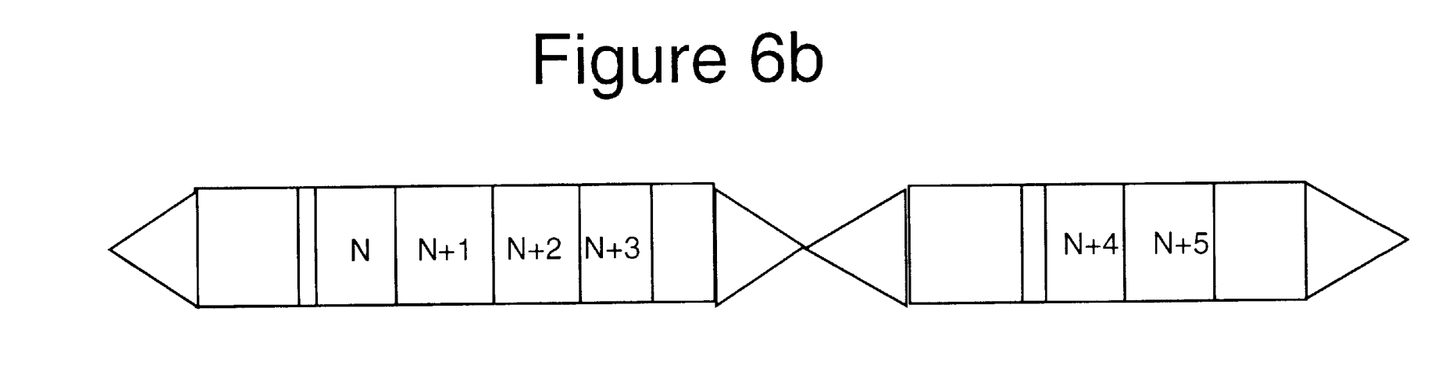
Figure 6C:
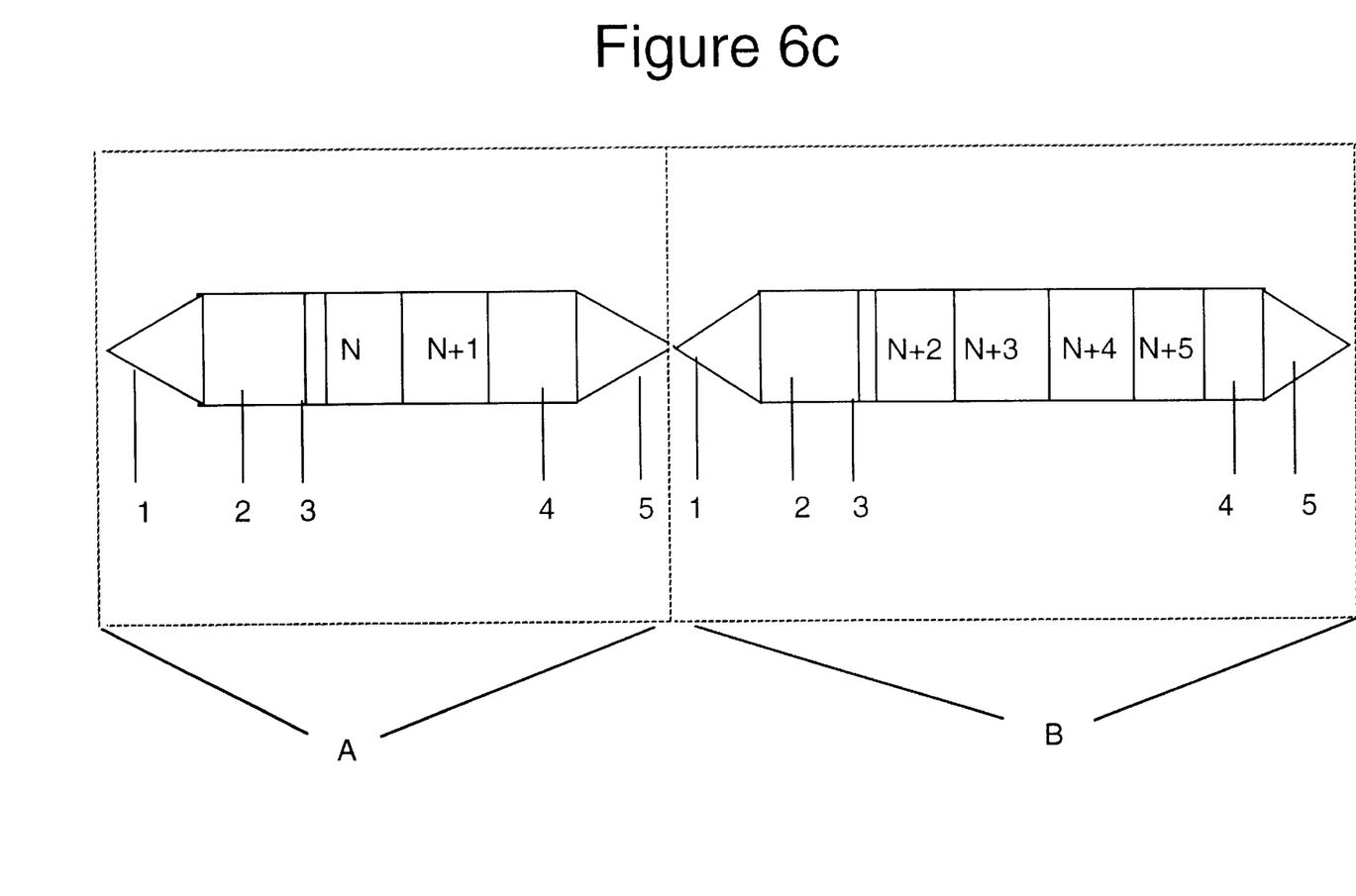

FIG. 6 is an example of a wireless access system using a TDMA format supporting the ITV-T G.726 ADPCM voice encoding standard. This standard allows for speech to be encoded at rates of 16, 24, 32 and 40 Kbits$^{-1}$. A TDD format, as in FIG. 5, is preferably employed. Reduced rate speech is preferably encoded at 24 Kbits$^{-1}$. Full rate speech is encoded at the standard rate of 32 Kbits$^{-1}$. With this system, a total channel capacity of 48 Kbits/sec is required for duplex communication. This represents an increase in system capacity of approximately one third over standard duplex systems that require 64 Kbits$^{-1}$ for duplex communication.

In FIG. 6 the TDD/TDMA channel uses frames with a capacity of 48 Kbits$^{-1}$. Each frame is further divided into six slots N, N+1, N+2, N+3, N+4, N+5 each having capacity of 8 Kbits$^{-1}$.

Referring generally to FIGS. 6 a,b & c. Each figure represents one frame of transmission within a TDD channel. Each frame has two parts A & B. Part A is the portion of the frame transmitted by Party A to the conversation. Part B of the frame is the portion of the conversation transmitted by Party B. Each part A & B of the frame has sections 1, 2,3,4 & 5. Section 1 is a signal ramp up section; section 2 is a synchronising portion; section 3 is a contention signalling bit, used to indicate whether or not the terminal will be transmitting on the next frame; section 4 is for frame overhead and miscellaneous signalling; section 5 is signal ramp down.

In every frame in the preferred embodiment, each party to the call is allocated two out of the six slots N, N+1, N+2, N+3, N+4, N+5. The remaining two slots are common to both part A and part B of the frame, and are allocated between parts A and B of the TDD frame as required.

In a preferred form of this system, when only one party is talking, their voice signal is encoded at 32 Kbits$^{-1}$. As this preferred embodiment requires 48 Kbits$^{-1}$ for duplex communication, an idle 16 Kbits$^{-1}$ slot within each TDD frame will remain. With improvements in encoding technology it may be possible to encode each party at Kbits$^{-1}$ during a contention period without noticeable reduction in perceived system performance.

The remaining two frames are allocated according to the state of the system. Where both parties are talking, each party is assigned 24 Kbits$^{-1}$ capacity (three sub-frames), as depicted in FIG. 6a. When only one party is talking, the frame capacity is divided between the parties as 32 Kbits$^{-1}$ for the talking party (four sub-frames) and 16 Kbits$^{-1}$ for the silent party (two sub-frames), as depicted in FIG. 6b & 6c. To achieve this, the two spare sub-frames are allocated to the talking party.

This system has the additional advantage that background noise can be transmitted within the 16 Kbits$^{-1}$ frame. Such background noise typically enhancing perceived system performance.

Figure 7:
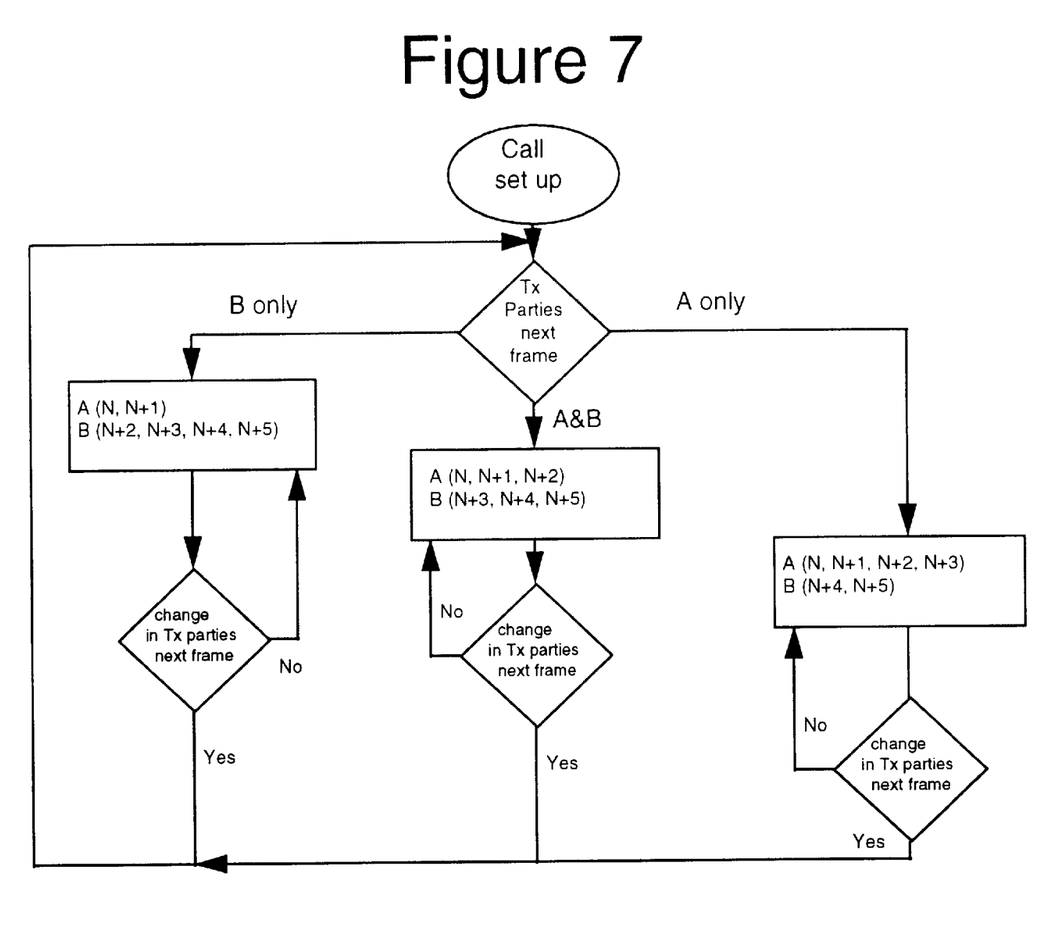
FIG. 7 is a flow chart of a wireless access system implementing the present invention.

FIG. 7 depicts a wireless system protocol. The parties to the call are nominated as party A and party B. Allocation of channel capacity is performed by the base station. As a party commences talking, their terminal requests access to the channel from the base station. The base station then checks whether or not the corresponding party to the call is talking. If the corresponding party is not talking, then the base station grants the talking party, 32 Kbits$^{-1}$ bandwidth.

When the corresponding party is talking, the base station grants the party requesting access, a 24 Kbits$^{-1}$ bandwidth signal. The base station also reduces the bandwidth of the corresponding party to 24 Kbits$^{-1}$.

In each case, the base station informs each party as to the slots of the sub frames they are to transmit on. Typically it will be established at call set up that party A has slots N and N+1 when silent and that party B has slots N+4 and N+5 when silent. Following this format, a typical system would allocate slot N+2 to party A and slot N+3 to party B when both parties are talking. Slots N+2 and N+3 both being allocated to which ever of party A or party B, is talking when the corresponding party is silent.

A similar TDD/TDMA system may be implemented for FAX and data transmissions. They system will preferably contain contention signalling on every frame. When the party receiving the fax is passive, the transmitting party may transmit at the full channel rate of 48 Kbits$^{-1}$. In the case of ITV-T G.726 ADPCM standard, a rate of 40 Kbits$^{-1}$ would be selected resulting in 8 Kbits$^{-1}$ spare capacity on the channel.

Preferably, the base station will control the allocation of channel resources between the parties. Contention signalling bits will be used by the receiving party to signal to the base station that control information is to be sent on the next frame or the next convenient frame, as per the system protocol. The base station will then allocate 8, 16, 24, 32, 40 or 48 Kbits$^{-1}$ transmission capacity for the control signalling of the receiving party.

The transmitting party will have the bandwidth of their signal reduced by an amount corresponding to the bandwidth allocated for the control signal of the receiving party. An alternative system may reduce the bandwidth of a data signal by reducing the error encoding rate used during the transmission of control signalling by the receiving party.

The present invention may be used for the transmission of various signals, such as voice, video and fax. Preferably the signal is real time, such as voice or video. Where data is transmitted, the present invention can provide an increase in system efficiency.

The present invention is preferably applied to digital networks such as ISDN networks, fixed wireless access systems such as the Ionica system implemented in the United Kingdom. The present invention also has application to analogue networks, where analogue signal compression can be supported. Such systems include analogue cable video transmission systems and other cable broadcasting systems, such as power line carriers.

What is claimed is:

1. A method of multiplexing signals transmitted by a number of terminals onto a communications link; the bandwidth of the terminals exceeding the capacity of the link; the method comprising the steps of:

i) monitoring the link for the occurrence of simultaneous transmission of signals over the link by two or more terminals;

ii) assigning portions of the link capacity to the transmitting terminals; the sum of said portions being equal to or less than the capacity of the link;

iii) varying an encoding rate of said signals transmitted by said terminals; and iv) varying a form of encoding, wherein said signals are digitally encoded; said bandwidth being varied by varying the rate of encoding; and wherein said signals are voice band signals and said encoding may be one of Adaptive Differential Pulse Code Modulation (ADPCM), Linear Predictive Coding (LPC), Adaptive Predictive Coding (APC), Multiple Excitation Linear Predictive Coding (MPC-LPC); whereby the bandwidth of the transmitted signals corresponds to the portions assigned to the terminals.

2. A method according to claim 1 wherein the link is a time division duplex link.

3. A method according to claim 1 wherein the link is a time division duplex link and said signals are encoded using a variable bit rate encoding scheme and wherein a 32 Kbits$^{-1}$ capacity is allocated to a terminal when only one terminal is transmitting and wherein a 16 Kbits$^{-1}$ capacity is allocated to both terminals when both are transmitting.

4. A system for the communication of signals in real time by a number of terminals over a channel; said system being adapted to vary the bandwidth of at least one signal such that the number of signals multiplexed onto said channel can be dynamically varied; wherein said signals are digitally encoded; wherein the channel is monitored for the occurrence of simultaneous transmission of signals over the channel by two or more sources; wherein portions of the channel capacity are assigned to the transmitting terminals with the sum of said portions being equal to or less than the capacity of the channel; said bandwidth being varied by varying an encoding rate of said signals; and wherein said signals are voice band signals and said encoding may be one of Adaptive Differential Pulse Code Modulation (ADPCM), Linear Predictive Coding (LPC), Adaptive Predictive Coding (APC), Multiple Excitation Linear Predictive Coding (MPC-LPC), a form of encoding said signals being varied such that the bandwidth of the transmitted signals corresponds to the portions assigned to the terminals.

5. A system as claimed in claim 4 wherein said channel is adapted for bi-directional communication.

6. A system as claimed in claim 4; wherein said channel is adapted for bi-directional communication; and wherein said channel is a Time Division Duplex channel.

\* \* \* \* \*